(12) United States Patent
Hyuga

(10) Patent No.: US 6,331,872 B1
(45) Date of Patent: *Dec. 18, 2001

(54) METHOD AND APPARATUS FOR TAKING VISUAL IMAGES

(76) Inventor: Makoto Hyuga, 25-58, Misumi-cho 2-chome, Higashimurayama-shi Tokyo 189 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/460,224

(22) Filed: Dec. 13, 1999

Related U.S. Application Data

(63) Continuation of application No. 09/075,588, filed on May 11, 1998, now abandoned, which is a continuation of application No. 08/464,650, filed on Jun. 21, 1995, now abandoned.

(51) Int. Cl.[7] .................................................. H04N 5/225
(52) U.S. Cl. ........................... 348/207; 348/211; 702/188
(58) Field of Search .................................... 348/207, 169, 348/232, 157, 159, 211; 700/91, 92; 702/188; 386/117; 473/407, 150, 156; 340/539, 573.1, 825.36, 825.49, 995

(56) References Cited

U.S. PATENT DOCUMENTS

| | | | |
|---|---|---|---|
| 4,794,417 | * 12/1988 | Sekiguchi et al. | 348/345 |
| 4,980,871 | * 12/1990 | Sieber et al. | 367/127 |
| 5,184,824 | * 2/1993 | Riedinger | 473/156 |
| 5,438,518 | * 8/1995 | Bianco et al. | 340/995 |
| 5,518,402 | * 5/1996 | Tommarello et al. | 434/226 |
| 5,576,838 | * 11/1996 | Renie | 386/117 |
| 5,818,733 | * 10/1998 | Hyuga | 702/188 |

* cited by examiner

Primary Examiner—Wendy R. Garber
Assistant Examiner—Aung S. Moe
(74) Attorney, Agent, or Firm—Morrison Law Firm

(57) ABSTRACT

A select/execute key (6) of a mobile unit (2) having a transmitter (1$_i$) is operated to transmit signals including ID data, and the transmitted signals are received by a receiver (11). The ID data is ascertained by a transmitter identifying component (12), and the direction and distance to transmitter (1$_i$) are determined by a direction/distance evaluation component (13), thus determining the location of the transmitter. When the location of transmitter (1$_i$) has been ascertained, a camera controller component 17 selects camera (14$_1$)–(14$_n$) or (14$_c$) and controls its panning and tilting, thereby adjusting its angle of view and bringing it into focus. Camera (14$_1$)–(14$_n$) or (14$_c$) is operated to take pictures for approximately one minute after the signals from transmitter (1$_i$) is received. Pictures taken by camera (14$_1$)–(14$_n$) or (14$_c$), as well as the ID of transmitter (1$_i$) ascertained by transmitter identifying component (12), are recorded on a picture recording component (18) in the order of elapsed time. Recorded images are edited by an editing component (19) according to the ID of transmitter (1$_i$) so that pictures corresponding to the same ID are extracted and dubbed on a standard video tape or a similar medium in the order of elapsed time by a dubbing device (20).

4 Claims, 10 Drawing Sheets

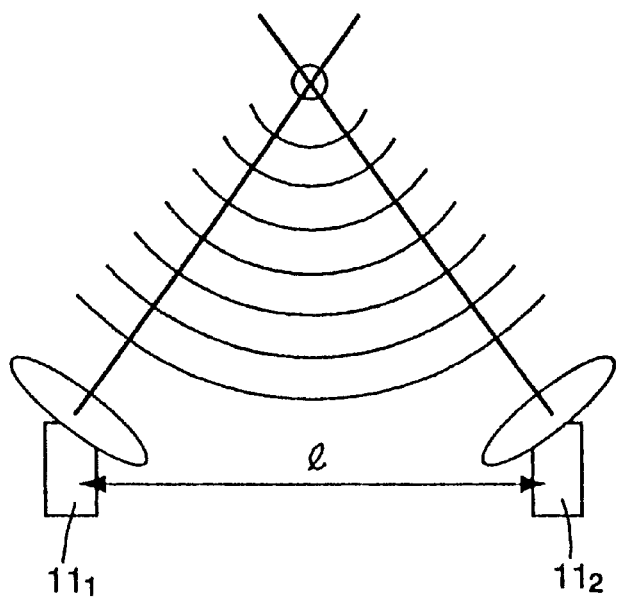
*F I G. 6*
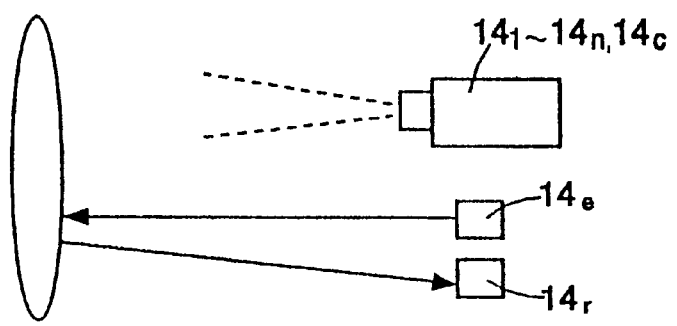
*F I G. 7*

METHOD AND APPARATUS FOR TAKING VISUAL IMAGES

This application is a continuation of pending application Ser. No. 09/075,588 filed May 11, 1998 now abandoned, which was a continuation of application Ser. No. 08/464,650 filed Jun. 21, 1995 now abandoned.

TECHNICAL FIELD

This invention relates to a method and an apparatus for taking pictures of a specific subject.

BACKGROUND ART

Nowadays, taking pictures of a player on a golf course or the like is usually done by a professional or amateur photographer taking a strip comprising approximately 10 frames at the starting hole or another member shooting a video of the player.

When taking pictures of a player, however, it is difficult for a nonaffiliated person to come into the course in view of the safety of players and the photographer himself and because of other reasons. On the other hand, having another player take pictures tends to disturb his concentration on the game.

Furthermore, in many cases pictures of a mere 10 frames or so taken at a starting hole are insufficient to be used for studying the player's swing and so on and serve no more than as souvenir pictures.

In addition, as the player often wants to study his swing throughout the game, taking pictures only at a starting hole is not wholly satisfactory, showing how good or bad his swings are only for at the starting hole.

Examples of conventional picture-taking apparatuses include one disclosed in Japanese Patent Laying -open No. 191133/1988 which calls for taking pictures of a subject by means of transmitting signals from a transmitting means attached to the subject and receiving these signals using a receiving means, another disclosed in Japanese Utility Model Laying -open No. 117625/1989 which means attached to the subject and causing a picture-taking device to follow the direction of the strongest signal, and another disclosed in Japanese Patent Laying-open No. 134351/1981 which calls for following a subject by means of a transmitting means attached to the subject and shooting for a specified period of time.

However, the configurations according to Japanese Patent Laying -open No. 191133/1988 and Japanese Utility Model Laying -open No. 117625/1989 merely call for causing a picture-taking device to follow a subject to take pictures thereof, and the configuration according to Japanese Patent Laying -open No. 134351/1989, too, is to take pictures of a subject for a specified period of time by means of simply orienting a picture-taking device in such a direction as to follow the subject. In other words, all of these configurations are capable only of taking pictures of a subject without consideration of the distance to the subject. Therefore, pictures are always taken under the same conditions, regardless of the distance between the subject and the picture-taking device, and often come out with unsatisfactory results, such as, for example, the subject is too small for the size of a frame or too large to fit completely in a frame.

In order to solve the above problems, a subject of the invention is to provide a picture-taking method and apparatus which is capable of reliably taking visual images of a subject while the subject is moving, ensuring an image of the subject within a frame maintains a nearly constant proportion in size.

DISCLOSURE OF INVENTION

A method according to the invention calls for transmitting signals from a subject whose picture is being taken, orienting a picture-taking device in the direction of the signals upon receiving them, measuring the distance between the picture-taking device and the subject in order to determine the degree of zooming, adjust the angle of view and bring the picture-taking device into focus, taking pictures of the subject with the picture-taking device after bringing it into focus as above, with this picture-taking procedure lasting for a specified length of time after receiving the signals, and recording the pictures. Therefore, the invention is capable of receiving signals from a subject, adjusting the direction and the angle of view in the direction of the subject, bringing the subject into focus by zooming, and perform the shooting with the picture-taking device for a specified length of time.

According to another feature thereof, the invention handles a plurality of subjects whose pictures are being taken, each of which has its own ID; signals to be transmitted include ID data corresponding to respective subjects; and shooting is performed with the ID data being specified. Therefore, according to the invention, it is easy to judge which subject corresponds to a given pictures.

According to yet another feature of the invention, pictures are classified and separately recorded depending on their ID data. Therefore, it is possible to separately record respective images of different subjects.

According to yet another feature of the invention, ID data is added to each picture, and images which are thus provided with respective ID data are continuously recorded in the order in which they are shot and then edited with respect to each ID data. Therefore, it is possible to edit pictures according to respective subjects with a minimal number of picture recording means.

According to yet another feature of the invention, a plurality of picture-taking devices are provided, and the most suitable device is chosen from among these picture-taking devices based on signals from a subject whose picture is being taken. With the configuration as above, the invention is effective in taking pictures of a subject with the most appropriate picture-taking device.

According to yet another feature of the invention, signals from a subject are received by a plurality of receivers, data for the location of the subject from which the signals have been sent is extracted based on said signals, and the distance between the subject and the picture-taking device is computed from the location extracted as above. With the configuration as above, the invention is effective in judging the location of a subject easily and taking pictures of the subject under the most appropriate conditions.

According to yet another feature of the invention, signals include locational data, and the distance and direction to the picture-taking device is computed from the locational data. With the configuration as above, the signal receiving device of the system is able to easily determine the location of a subject whose picture is being taken without having to be provided with a location detection means.

Further, according to yet another feature of tie invention, the invention is provided with one or more transmitting means which are respectively in the possession of subjects whose pictures are being taken and transmit signals; a signal receiving means to receive signals from the transmitting means; an extracting component to extract the location of the transmitting means based on the signals received by the receiving means; a picture-taking device for taking pictures of the subject, the picture-taking device being capable of zooming and bringing the subject into focus according to the distance thereto; a picture-taking device controller component to adjust the direction and angle of view of the picture-taking device based on the location extracted by the extracting component; and a picture recording means to record pictures taken by the picture-taking device. With the configuration as above, the invention is capable of receiving signals from a subject whose picture is being taken by means of the receiving means, adjusting the direction and the angle of view in the direction of the subject by means of the picture-taking device controller component, thereby bringing the subject into focus and taking pictures of same.

According to yet another feature of the invention, transmitting means have their own respective IDs, data for which is included in signals transmitted by the corresponding transmitting means, and the receiving means is provided with an ID discriminating means to determine the identification of the transmitting means based on the ID data included in the received signals. With the configuration as above, judgement can be easily made as to which transmitting means the subject whose picture has been taken corresponds to.

According to yet another feature thereof, the invention is provided with a plurality of picture recording means as well as a selecting means to select picture recording means according to respective ID data. With the configuration as above, it is possible to separately record respective images of different subjects.

According to yet another feature of the invention, the picture recording means adds ID data to each picture image when recording same, and an editing means which edits picture images having ID data attached as above with respect to each ID data is provided. With the configuration as above, the invention is capable of separating picture images according to respective subjects with a minimal number of picture recording means.

According to yet another feature thereof, the invention is provided with a plurality of picturetaking devices and a picture-taking device selecting means to choose at least one picture-taking device from among these picture-taking devices. With the configuration as above, the invention is effective in taking pictures of a subject with the most suitable picture-taking device selected by the picture-taking device selecting means.

According to yet another feature thereof, the invention is provided with a plurality of signal receiving means, a location extracting means to extract data for the location of the subject from which the signals have been sent according to signals received by said signal receiving means, and a computing means to compute the distance between the subject and the picture-taking device based on the location extracted as above. With the configuration as above, the invention is capable of determining the exact location of a subject according to, for example, the principle of triangulation using a plurality of signal receiving means, thereby taking pictures of the subject under the most appropriate conditions.

According to yet another feature of the invention, a location detection means to detect the respective locations of transmitting means is provided, signals transmitted by each transmitting means include locational data, and the computing means computes the distance and direction from the picture-taking device to said transmitting means based on the locational data received as above. With the configuration as above, the part of the system occupied by the signal receiving means is able to easily determine the location of a subject whose picture is being taken without having to be provided with a location detection means.

BRIEF DESCRIPTION OF DRAWINGS

FIG. 6 is an explanatory drawing to illustrate the manner of triangulation range finding at the time of location extraction of FIG. 5;

FIG. 7 is an explanatory drawing to illustrate range finding by the aforementioned camera.

BEST MODE FOR CARRYING OUT THE INVENTION

Figure 1:
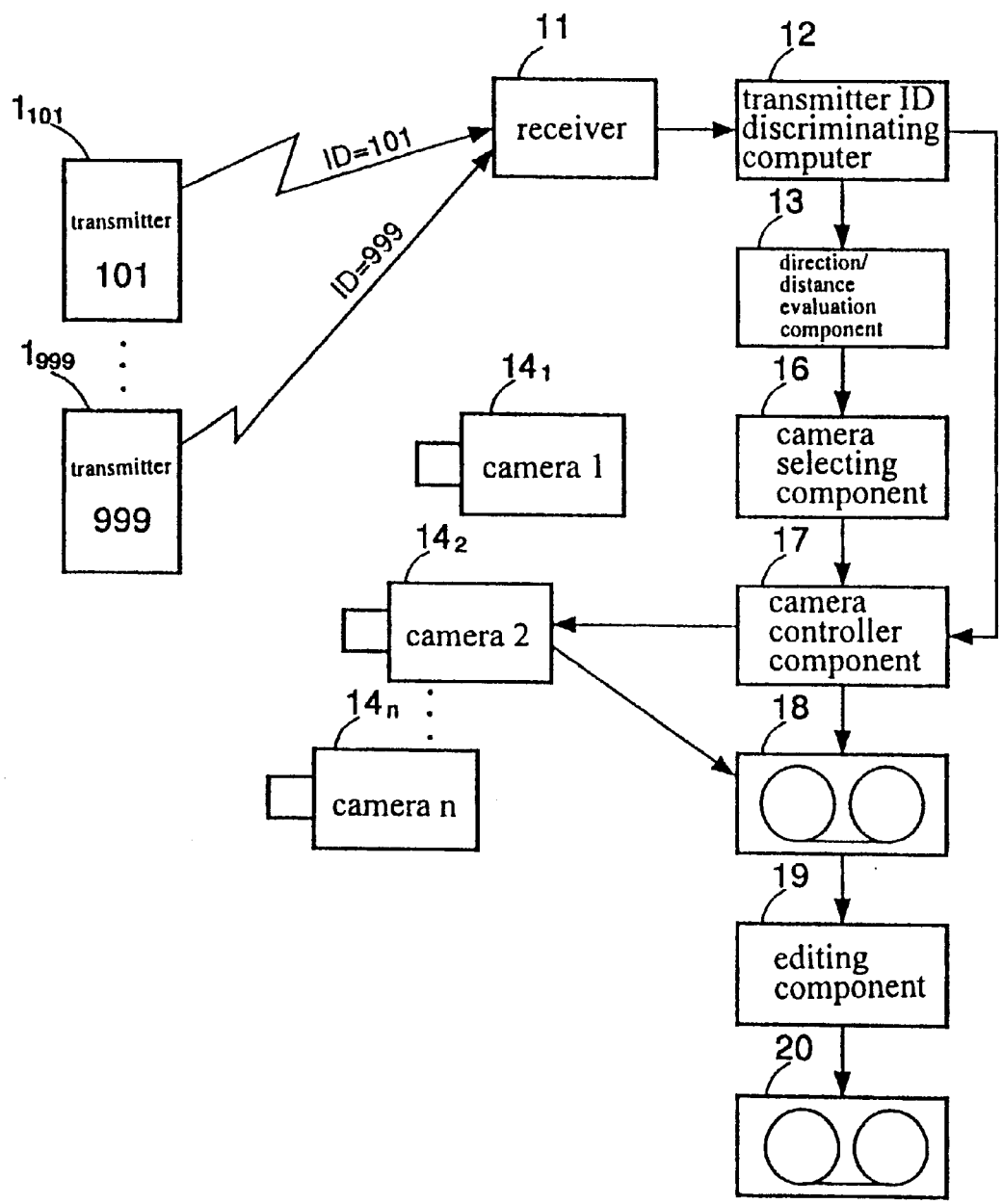
FIG. 1 is a block diagram illustrating a picture-taking apparatus according to an embodiment of the present invention.

Next, an apparatus for taking pictures of a subject according to an embodiment of the present invention is explained hereunder, referring to the drawings, as to a case where the apparatus is utilized on a golf course.

In FIG. 1, numerals $1_{101}$ to $1_{999}$ denote transmitters having the function of the transmitting means referred to in the appended claims. Each transmitter $1_{101}$ to $1_{999}$ has its own ID and is incorporated in a mobile unit 2 shown in FIG. 2, being capable of sending out signals including its own ID data.

Figure 2:
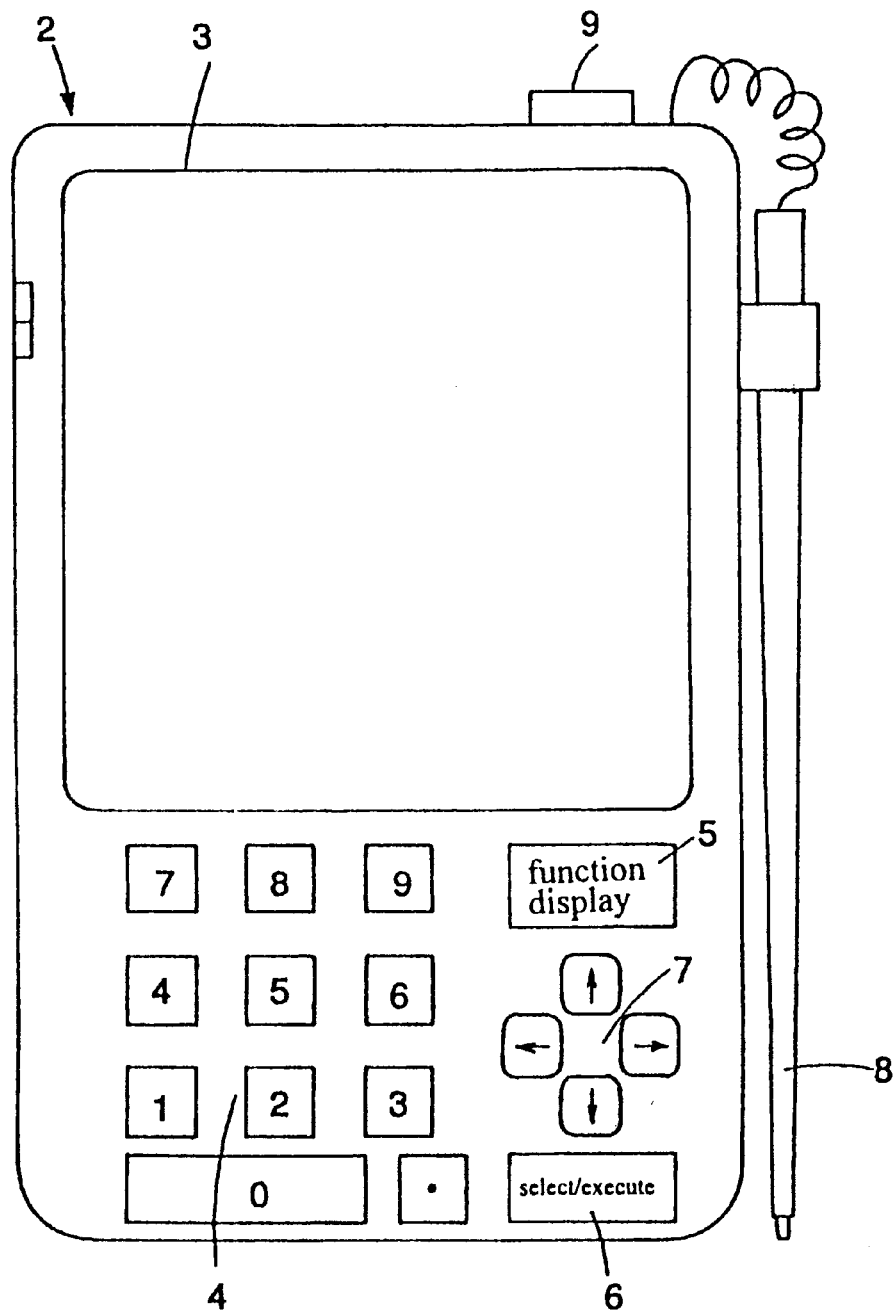
FIG. 2 is a front view of a mobile unit of same.

Portable equipment 2 shown in FIG. 2 is provided with a liquid crystal display 3 to display guidance and other information, a ten-key pad 4 to input scores and so forth, a function display key 5 for calling out a display of functions, a select/execute key 6 and scroll keys 7, as well as a light pen 8 attached to the mobile unit, and an emergency button 9 located on the topside of the mobile unit. In addition to transmitting signals, mobile unit 2 is also capable of performing such functions as score tabulation, detecting its own location, guidance display, settling accounts and so forth.

As shown in FIG. 1, a signal sent out from any given transmitter $1_i$ from among transmitters $1_{101}$ to $1_{999}$ is received by a receiver 11 serving as a signal receiving means and disposed at an arbitrary location which is not shown in the drawings, for example, at any place on the course.

The signal received by receiver 11 is processed by a transmitter identifying component 12, which serves as an ID discriminating means, and a direction/distance evaluation component 13, transmitter identifying component 12 ascertaining the ID of transmitter $1_i$ that transmitted the signal based on its ID data, and direction/distance evaluation component 13 judging the direction and the distance to transmitter $1_i$.

Figure 3:
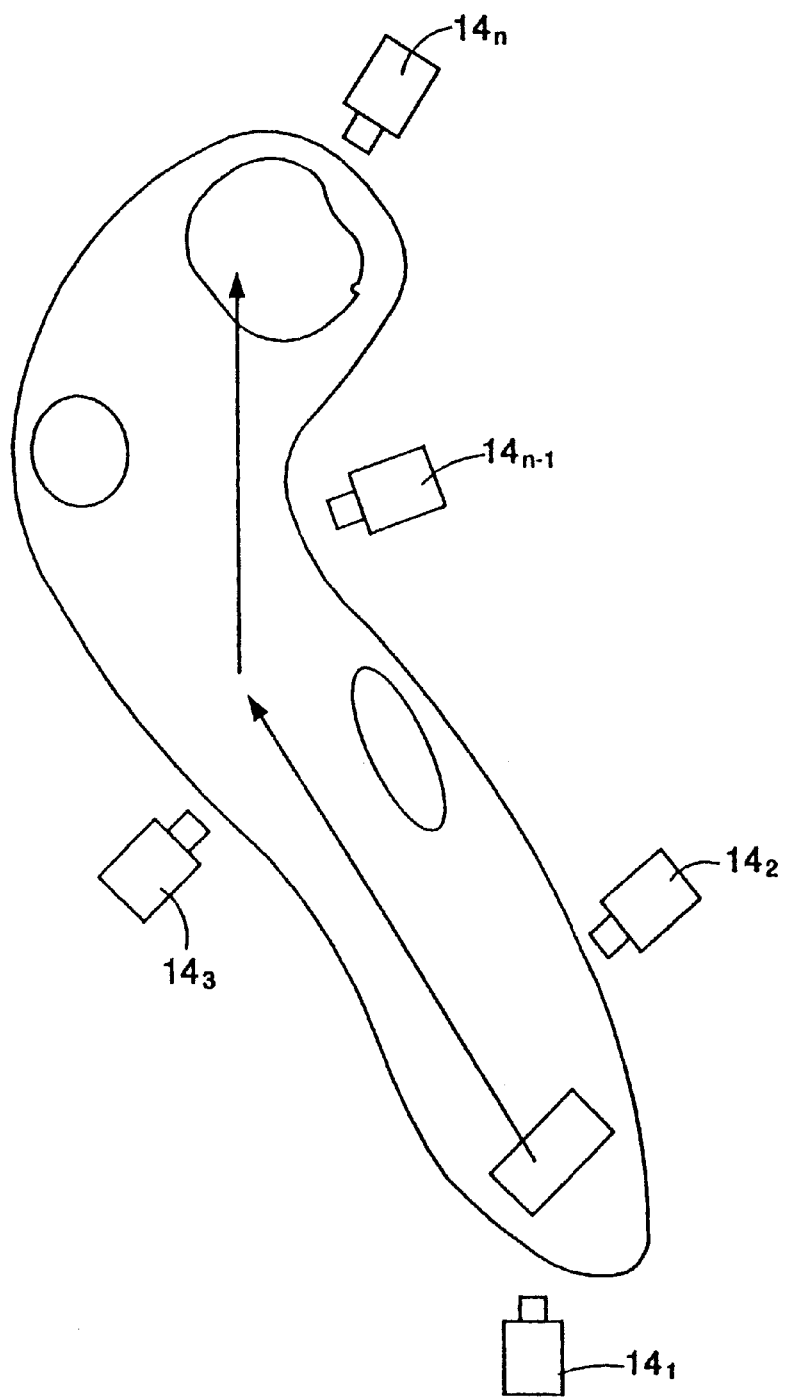
FIG. 3 is an explanatory drawing of disposition of cameras of same.
Figure 4:
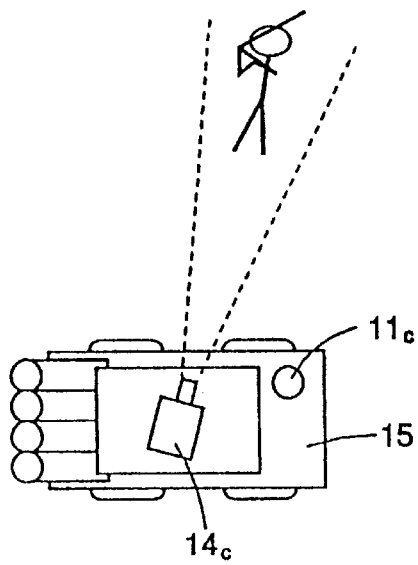
FIG. 4 is an explanatory drawing to show how the camera placed on a cart is used.

FIG. 3 shows a medium par-4 hole, which is provided, as shown in the drawing, with a plurality of cameras $14_l$ to $14_n$ installed around the course. If necessary, an on-vehicle camera $14_c$ may be mounted on a cart 15 together with an on-vehicle receiver $11_c$ as the present embodiment shown in FIG. 4. Each camera $14_l$~$14_n$ or $14_c$ is respectively provided with mechanisms to perform panning, tilting as well as zooming and may also be provided with auto-focus capability. In FIG. 3, camera $14_l$ is for a left-handed tee shot or taking pictures of a second shot from the rear; camera $14_2$ is for a tee shot; camera $14_3$ is for taking pictures of a right-handed shot or a left-handed shot from the rear; camera $14_{n-1}$ is for a second shot or taking pictures of a left-handed shot from the rear; and camera $14_n$ is for an approach shot or taking pictures of a second shot from the front. Camera $14_c$ in FIG. 4 is for taking pictures at close-range.

When the direction and distance to the aforementioned arbitrary transmitter $1_i$ which transmitted signals have been determined by direction/distance evaluation component 13, the most suitable camera is chosen by a camera selecting component 16 from among cameras $14_l$ to $14_n$ and $14_c$, and camera $14_i$ thus selected is controlled by a camera controller component 17 to perform panning, tilting and zooming. However, on-vehicle camera $14_c$ need not be used as camera $14_i$. The definition of the aforementioned term "the most suitable camera" to be selected by camera selecting component 16 may be determined by the user's discretion; for example, it may be set beforehand as the camera which is closest and facing the subject whose picture is being taken from the front, or it may always be selected from among those located behind the subject; or simply the closest one; or a special criterion may be set for left-handed players. In cases where a hole is specified to hold a near-pin contest or a driving contest, overall measurement which is free from subjectivity is possible by means of operating all cameras $14_l$ to $14_n$ and $14_c$, or a part of all the cameras, i. e. at a near-pin contest hole, those cameras which have a view of an area from the tee ground to the entire green, and, at a driving contest hole, those which have a view of an area from the tee ground to the furthest possible lie after the first shot. Especially in such contests, these cameras can serve as a tool for an objective evidence of a hole-in-one at a hole for a near-pin contest and an albatross at a hole for a driving contest.

After transmitters $1_{101}$ to $1_{999}$ are operated, cameras $14_l$ to $14_n$ and $14_c$ shoot for about one minute, which is normally a sufficient time length to complete a swing. Images taken by cameras $14_l$ to $14_n$ and $14_c$ are recorded on a picture recording component 18 which serves as a recording means, such as video tape, RAM, hard disk or the like. ID data is also recorded on picture recording component 18 together with pictures shot by cameras $14_l$ to $14_n$ and $14_c$.

Data recorded on picture recording component 18 is edited for each ID by editing component 19, and pictures for each ID are edited in the order of elapsed time and recorded by a dubbing device 20 which records data on such a medium as a standard video tape.

Figure 5:
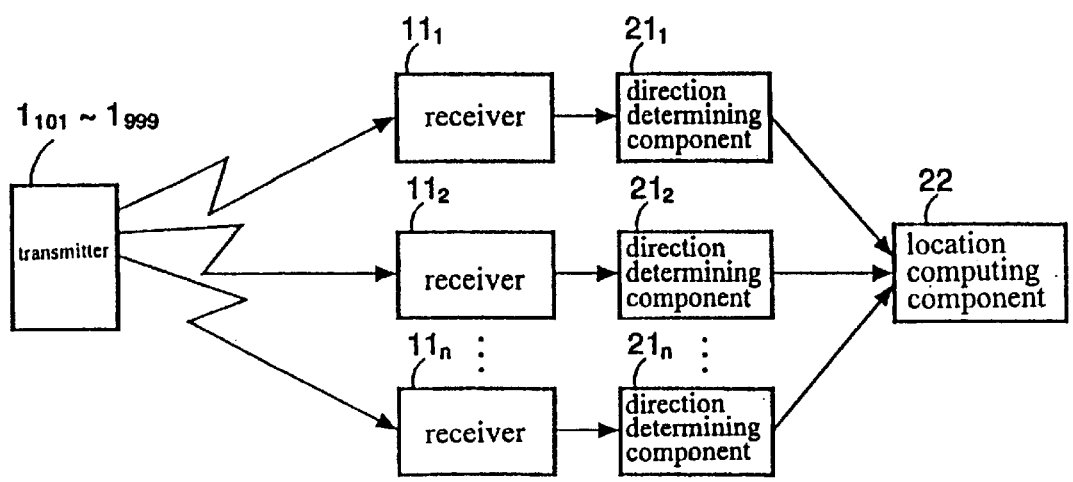
FIG. 5 is a block diagram illustrating extraction of a location by means of a plurality of receivers of same.

As shown in FIG. 5, receiver 11 has a plurality of signal receiving devices $11_l$ to $11_n$ which are respectively provided with antennae and direction determining components $21_l$ to $21_n$ which respectively correspond to signal receiving devices $11_l$ to $11_n$. The respective locations of transmitters $1_{101}$ to $1_{999}$ are detected by a location computing component 22 based on directions determined by these direction determining components $21_l$ to $21_n$. As to a number of signal receiving devices $11_l$ to $11_n$ at least two devices are needed to determine a direction and a distance by using the principle of triangulation.

Next, operation of the above embodiment is described hereunder.

First of all, when his turn to play comes, just prior to getting set, a player operates select/execute key 6 of mobile unit 2 which has a transmitter $1_i$ so that transmitter $1_i$ transmits signals including ID data corresponding thereto. The transmitted signals are received by receiver 11 and the ID data thereof is ascertained by transmitter identifying component 12.

Then, the direction of transmitter $1_i$ and the distance thereto are determined by direction/distance evaluation component 13 by means of, for example, providing a plurality of signal receiving devices $11_l$ to $11_n$ as shown in FIG. 5 and determining the direction to transmitter $1_i$ from each signal receiving device $11_l$ to $11_n$ by each direction/distance evaluation component $21_l$ to $21_n$ corresponding thereto based on signals received by respective signal receiving devices $11_l$ to $11_n$. In other words, as distance l between two signal receiving devices $11_l$ and $11_2$ is constant as shown in FIG. 6, the location of transmitter $1_i$ that transmitted the signals is determined by location computing component 22 by ascertaining the directions to transmitter $1_i$ from respective signal receiving devices $11_1$ and $11_2$.

When the location of transmitter $1_i$ has been determined as above, camera selecting component 16 makes selection from among cameras $14_l$ to $14_n$ and $14_c$ according to specific criteria determined beforehand to select the most suitable camera, and camera controller component 17 controls panning and tilting of the selected camera, thereby adjusting its angle of view.

Selected camera $14_l$~$14_n$ or $14_c$ determines the distance to the subject based on the distance measured by direction/distance evaluation component 13 or by automatic focusing using components incorporated in the camera itself, such as light emitting elements and photo-electric elements or, as shown in FIG. 7, an ultrasonic transmitter 14e and ultrasonic receiver 14r, said automatic focusing being performed by emitting light or signals from the light emitting elements or ultrasonic transmitter 14e and computing the distance to the subject based on the length of time from when the light or the signals are emitted to when they are received by the photo-electric elements or ultrasonic receiver 14r.

Figure 8:
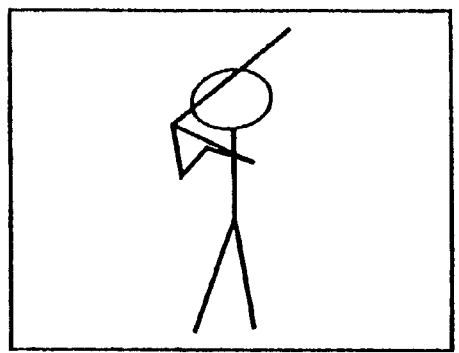
FIG. 8 is an explanatory drawing of a subject in a picture frame.
Figure 9:
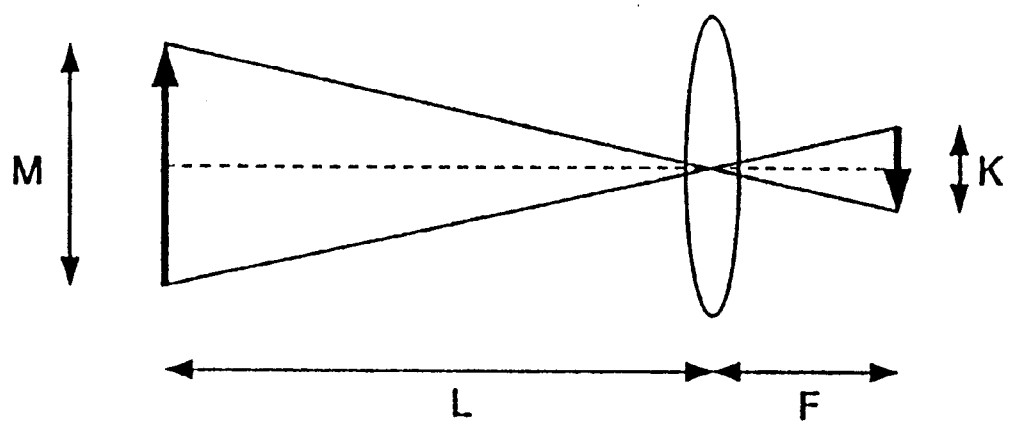
FIG. 9 is an explanatory drawing to illustrate the relationship between the distance and zooming with said camera.

At this time, camera $14_l$~$14_n$ or $14_c$ is zoomed so that the proportion of the image of the subject in relation to the size of the frame is constant as shown in FIG. 8. In other words, when the distance from camera $14_l$~$14_n$ or $14_c$ to the subject is L, the height of the subject M, the focal length of the lens of the camera F, and the length of the image of the subject in the frame K as shown in FIG. 9, K is approximately equal to F×M/L, if value L is sufficiently large. Therefore, granting that M is the average height of an adult and constant, K can be made constant by changing focal length F according to distance L to transmitter $1_i$ which has been measured.

Under the above condition camera $14_l$~$14_n$ or $14_c$ is operated to shoot for a specified period of time: for example a length of time presumed sufficient for a player to complete a swing, which may be one minute after receiving the signals from transmitter $1_i$.

Figure 10:
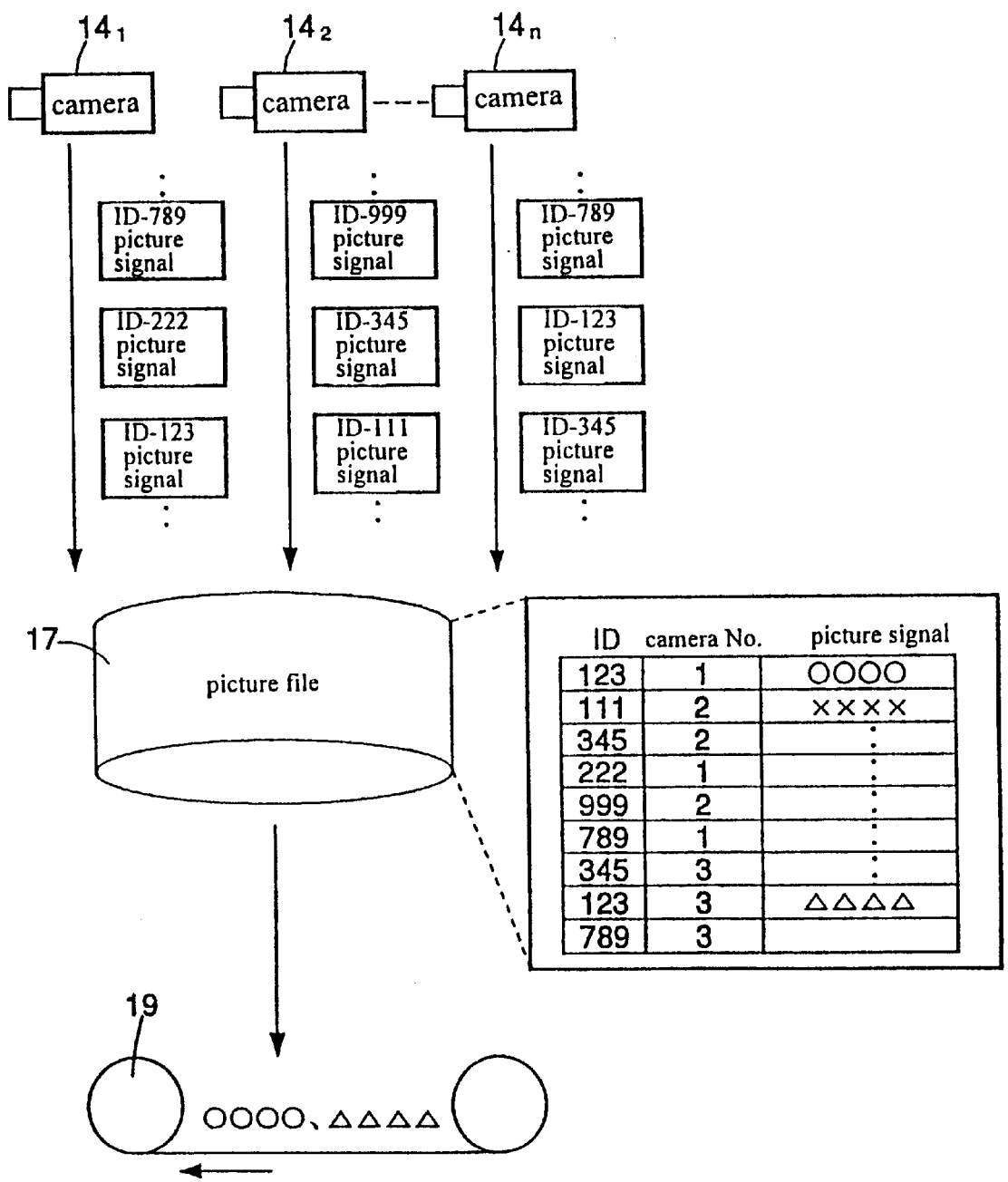
FIG. 10 is an explanatory drawing to illustrate the manner of editing.

As shown in FIG. 10, the ID of transmitter $1_i$, which was ascertained by transmitter identifying component 12, is recorded in the order of elapsed time on picture recording component 18 together with pictures taken by camera $14_1$~$14_n$ or $14_c$. At this time, images may be compressed to be recorded on picture recording component 18.

Then, the recording is edited by editing component 18 by using IDs recorded on picture recording component 18 so that images belonging to the same ID are extracted. The extracted data is dubbed on a standard video tape or the like in the order of elapsed time by dubbing device 20. When dubbing is performed, such data as the hole numbers and the locations of shooting, which can be determined based on the locations of the subject, the ID number of the camera and so forth, may be added.

Figure 11:
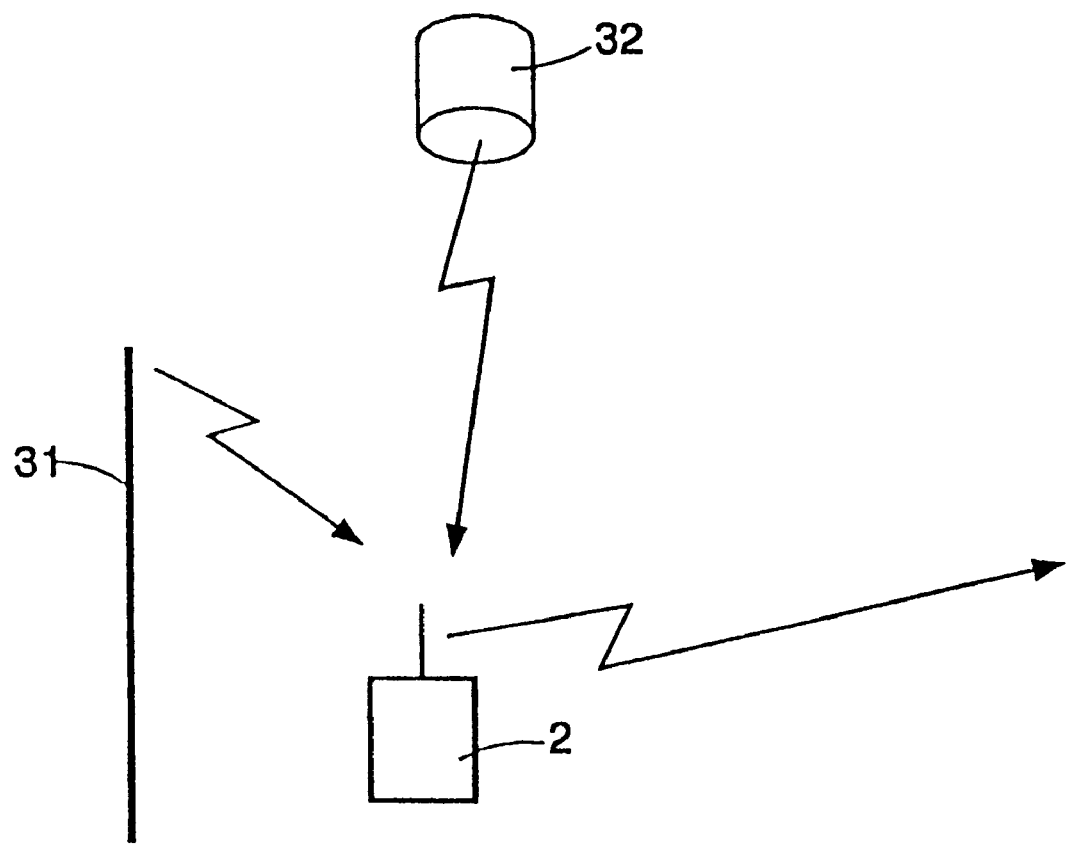
FIG. 11 is an explanatory drawing to illustrate the manner of location detection by means of GPS.

Next, referring to FIG. 11, another embodiment of the present invention which calls for detecting a location by means of mobile unit 2 itself and transmitting signals including the data for the location thus detected is explained hereunder.

In this case, the direction and distance to mobile unit 2 from camera $14_1$~$14_n$ or $14_c$ may be determined by means of, for example, providing holes with a plurality of antennae 31 which transmit reference radio waves or providing mobile unit 2 with a navigation function such as GPS (Global Positioning System) which uses reference radio waves from a plurality of satellites 32 and displays the location of mobile unit 2 in terms of latitude and longitude so that the direction and distance to mobile unit 2 from camera $14_1$~$14_n$ or $14_c$ can be computed from the absolute locations of mobile unit 2 and the camera.

Figure 12:
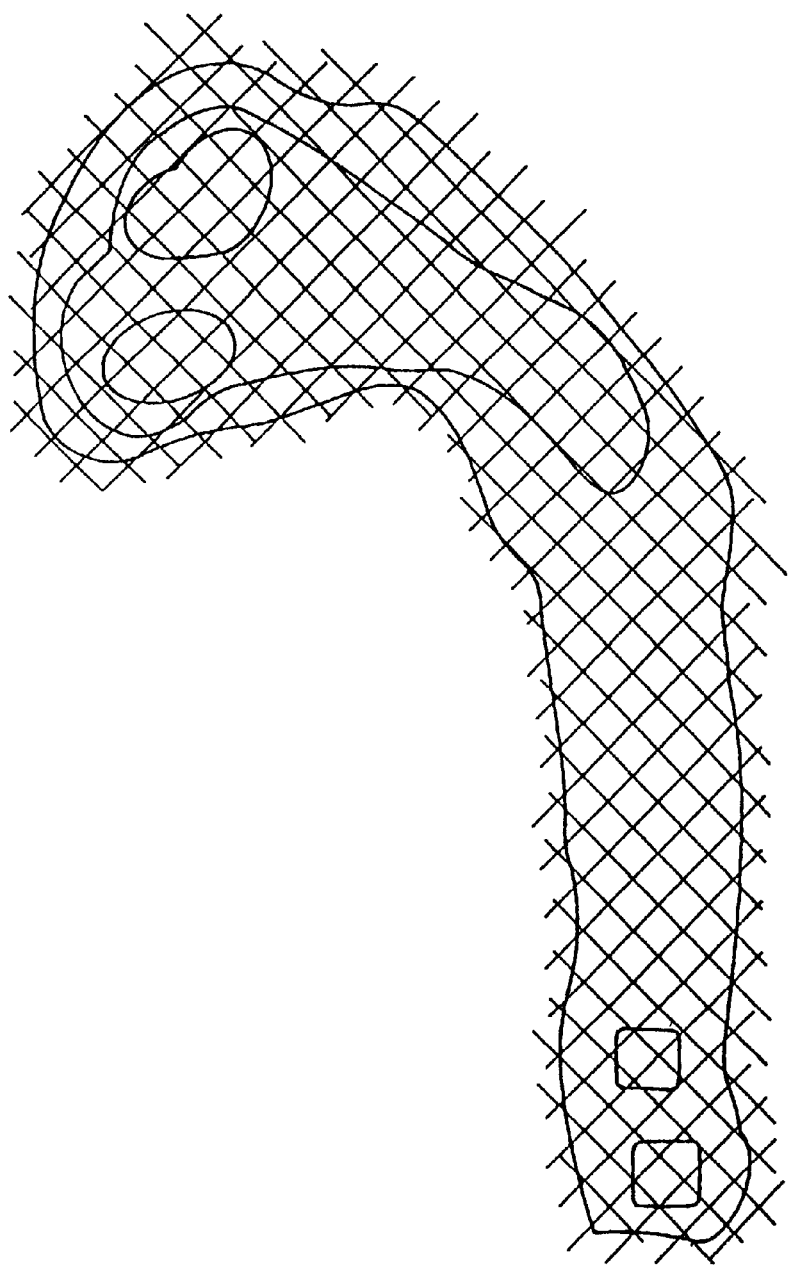
FIG. 12 is an explanatory drawing to illustrate a course divided into cells.

As shown in FIG. 12, the terrain of a hole or the entire course may be divided into cells in a matrix, each cell having its own ID number, so that the location of mobile unit 2 may be represented by a cell number. In cases where this cell system is applied, data for the respective directions and distances to the cells with respect to each camera $14_1$~$14_n$ or $14_c$ may be stored beforehand so that cameras $14_1$~$14_n$ and $14_c$ can be selected and controlled by directly using said data. Furthermore, various specific conditions which influence the selection of the camera used for each cell may be included in the cell data to be stored. Cells are formed by dividing the entire course or the terrain from the tee ground to the green of each hole into small areas in a matrix which measures, for example, 3 m on a side.

Figure 13:
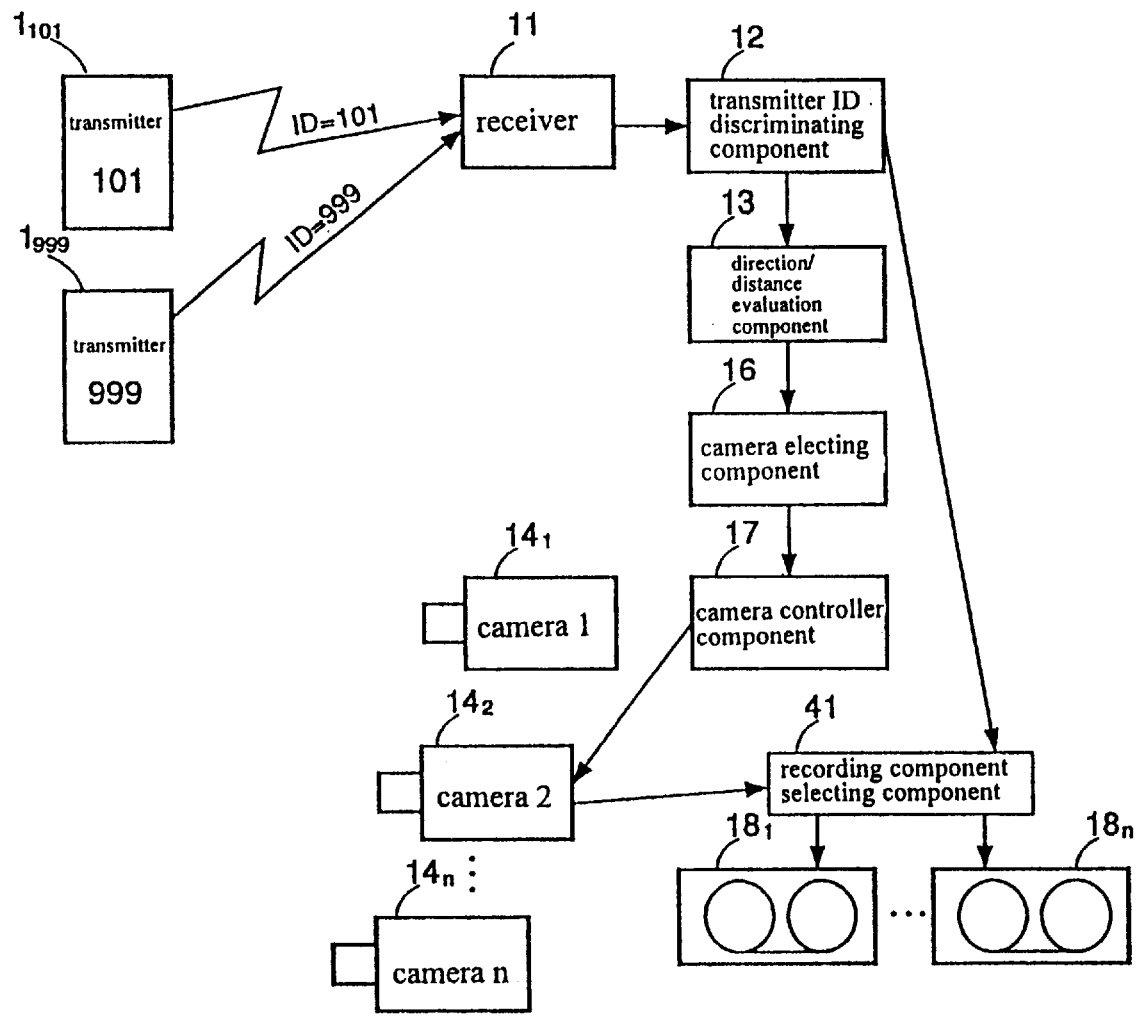
FIG. 13 is a block diagram illustrating a picture-taking apparatus according to another embodiment of the present invention.

As shown in FIG. 13, a plurality of picture recording components $18_1$ to $18_n$ may be connected to each other, and a picture recording component selecting component 41 may be provided so that picture recording component selecting component 41 sorts and respectively records signals transmitted from cameras $14_1$~$14_n$ and $14_c$ on different picture recording components $18_1$ to $18_n$, which may be video tape, RAM or the like, according to IDs included in the signals. In this manner, with images corresponding to different IDs being separately recorded on respective picture recording components $18_1$ to $18_n$ from the beginning, a number of picture recording components is increased, but, on the other hand, pictures can be sorted by IDs without having to undergo the editing process.

INDUSTRIAL APPLICABILITY

As described above, a method and an apparatus for taking pictures of a specific subject according to the present invention is suitable to be used for taking pictures of a player throughout a golf course or other locations.

What is claimed is:

1. A method of taking pictures of a subject at a location on a golf course comprising, transmitting signals including locational data from the subject, receiving the signals from the subject and determining from the locational data, a direction/distance of the subject, selecting, based on the direction/distance of the subject, a camera from a plurality of cameras installed around the golf course and orienting the selected camera toward the subject, computing with said locational data a distance between the subject and a location of the selected camera, determining a degree of selected camera zooming responsive to said computed distance and zooming the selected camera to the zooming degree thereby adjusting an angle of view, focusing the selected camera responsive to said computed distance, and then taking a picture of the subject with the selected camera.

2. A method of taking pictures, according to claim 1, wherein:

said signals include identification data from said subject; and said picture being taken with said identification data being specified.

3. A method of taking pictures, according to claim 2, further comprising the steps of:

recording said picture according to said identification data; and storing said picture separately according to said signal and said identification data.

4. A method of taking pictures, according to claim 3, further comprising the steps of:

combining said picture with said identification data;

taking additional pictures of said subject;

editing said pictures according to said identification data; and storing said edited pictures according to said identification data and said locational data.

* * * * *